(12) United States Patent
Nakamura (10) Patent No.: US 7,811,193 B2
(45) Date of Patent: Oct. 12, 2010

(54) SPEED REDUCTION DEVICE

(75) Inventor: Koji Nakamura, Tsu (JP)

(73) Assignee: Nabtesco Corporation, Tokyo (JP)

( * ) Notice: Subject to any disclaimer, the term of this patent is extended or adjusted under 35 U.S.C. 154(b) by 326 days.

(21) Appl. No.: 12/063,267

(22) PCT Filed: Aug. 7, 2006

(86) PCT No.: PCT/JP2006/315602

§ 371 (c)(1),
(2), (4) Date: Feb. 8, 2008

(87) PCT Pub. No.: WO2007/018181

PCT Pub. Date: Feb. 15, 2007

(65) Prior Publication Data

US 2009/0258748 A1    Oct. 15, 2009

(30) Foreign Application Priority Data

Aug. 11, 2005  (JP) .............................. 2005-232877

(51) Int. Cl.
*F16H 1/32* (2006.01)
(52) U.S. Cl. .................................................... 475/179
(58) Field of Classification Search ................. 475/178, 475/179
See application file for complete search history.

(56) References Cited

U.S. PATENT DOCUMENTS

| 4,898,065 | A  | * | 2/1990 | Ogata et al. .................. 475/179 |
| 6,508,737 | B2 | * | 1/2003 | Fujimoto ..................... 475/178 |
| 6,679,801 | B2 | * | 1/2004 | Nohara et al. ................ 475/179 |

FOREIGN PATENT DOCUMENTS

| JP | 62-4586 A | 1/1987 |
| JP | 09-026014 A | 1/1997 |
| JP | 2004084920 A | 3/2004 |
| JP | 2005-061519 A | 3/2005 |
| WO | 2005/015011 A1 | 2/2005 |

\* cited by examiner

*Primary Examiner*—Dirk Wright
(74) *Attorney, Agent, or Firm*—Panitch Schwarze Belisario & Nadel LLP (57) ABSTRACT

A low-noise speed reduction device that is simple in structure, small-sized, and little in energy loss is provided. Two-stage gears, i.e., a large-diameter gear 65 and a small-diameter gear 66 of a third external gear 63 are supported by a supporting shaft 59, and one-stage second external gear 58 that meshes with the small-diameter gear 66 is only attached to an axial one end of a crankshaft 40. Therefore, the axial length of the whole speed reduction device becomes short, and consequently, miniaturization becomes possible. Further, since gears mesh with each other only in two places until a driving force is transmitted to the crankshaft 40 from the first external gear 54, noises can be reduced, and energy loss can also be lowered.

9 Claims, 6 Drawing Sheets

SPEED REDUCTION DEVICE

CROSS-REFERENCE TO RELATED APPLICATION

This application is a section 371 of International Application No. PCT/JP2006/315602, filed Aug. 7, 2006, which was published in the Japanese language on Feb. 15, 2007 under International Publication No. WO 2007/018181 A1 and the disclosure of which is incorporated herein by reference.

TECHNICAL FIELD

The present invention relates to a speed reduction device in which a pre-stage speed reducer composed of external gears, and an eccentrically oscillating speed reducer are combined together.

BACKGROUND ART

As a conventional speed reduction device, for example, a speed reduction described in the following JP-A-62-4586 is known.

This speed reduction device includes an eccentrically oscillating speed reducer having a plurality of crankshafts axial opposite ends of which are rotatably supported by a carrier and that are spaced apart at equal distances in a circumferential direction, a first external gear that is attached to an output shaft of a motor, and rotates as a driving force is transmitted thereto from the motor, second external gears that are attached to axial one ends of all the crankshafts, and third external gears that are rotatably supported by the output shaft of the motor, and have small-diameter gears that mesh with the second external gears and have a smaller diameter than the second external gears, and large-diameter gears. Here, fourth external gears that are arranged close to axial one ends of all the crankshafts while keeping coaxial relationship with the second external gears, that have large-diameter gears meshing with the first external gear and having a larger diameter than the first external gear, and small-diameter gears meshing with the large-diameter gears of the third external gears and having a smaller diameter than the large-diameter gears is rotatably supported.

However, in such a conventional speed reducer, three-stage external gears, i.e., the second external gears and the large diameter gears and small diameter gears of the fourth external gears are arranged to close one another at an axial one end of each of the crankshafts. Therefore, the whole speed reduction device becomes large in its axial length, and becomes large in its size. Also, gears mesh with each other in three places, that is, between the first external gear and the large-diameter gears of the fourth external gears, between the small-diameter gears of the fourth external gears and the large-diameter gears of the third external gears, and between the small-diameter gears of the third external gears and the second external gears. As a result, there is a problem in that noises become large, and energy loss becomes large. Moreover, since two type of gears (third and fourth external gears) having large-diameter gears and small-diameter gears are used, there is also a problem in that the structure becomes complicated.

DISCLOSURE OF THE INVENTION

Problems to be Solved by the Invention

The object of the invention is to provide a low-noise speed reduction device that is simple in structure, small-sized, and little in energy loss.

Such an object can be achieved by a speed reduction device including: an eccentrically oscillating speed reducer having a plurality of crankshafts axial opposite ends of which are rotatably supported by a carrier, and that are spaced apart at equal distances in a circumferential direction; a first external gear that rotates as a driving force is transmitted thereto from a motor; a second external gear that is attached to an axial one end of at least any one of the crankshafts; a supporting shaft that is supported by the carrier; a rotatable third external gear having a large-diameter gear meshing with the first external gear and having a larger diameter than the first external gear, and a small-diameter gear meshing with the second external gear and having a smaller diameter than the second external gear.

EFFECTS OF THE INVENTION

In the invention, as mentioned above, two-stage gears, i.e., the large-diameter gear and small-diameter gear of the third external gear are supported by the carrier, while one-stage second external gear that meshes with the small-diameter gear is only attached to the axial one end of each of the crankshafts. Therefore, since gears mesh with each other only in two places, that is, between the first external gear and the large-diameter gear of the third external gear, and between the small-diameter gear of the third external gear and the second external gear until a driving force is transmitted to the crankshafts from the first external gear, noises can be reduced, and energy loss can also be reduced. Moreover, since only one type of the third external gear have the large-diameter gear and small-diameter gear, the structure can be made simple.

Further, since the supporting shaft is on the radial outside of the imaginary circle passing through the central axes of all the crankshafts, the diameter of the large-diameter gear of the third external gear can be made larger, and thereby, the speed reduction ratio of a speed reduction device can be increased easily.

Moreover, when the carrier is composed of two or more members, if the supporting shaft is composed of a fastening member that fasten the two or more members together, the fastening member can be used commonly for fastening of the carrier, and for supporting of the third external gear, and thereby, the structure becomes simple, and the production cost can also be made low.

BEST MODE FOR CARRYING OUT THE INVENTION

Hereinafter, preferable embodiments of the invention will be described with reference to the drawings

Embodiment 1

Hereinafter, Embodiment 1 of the invention will be described with reference to the drawings.

Figure 1:
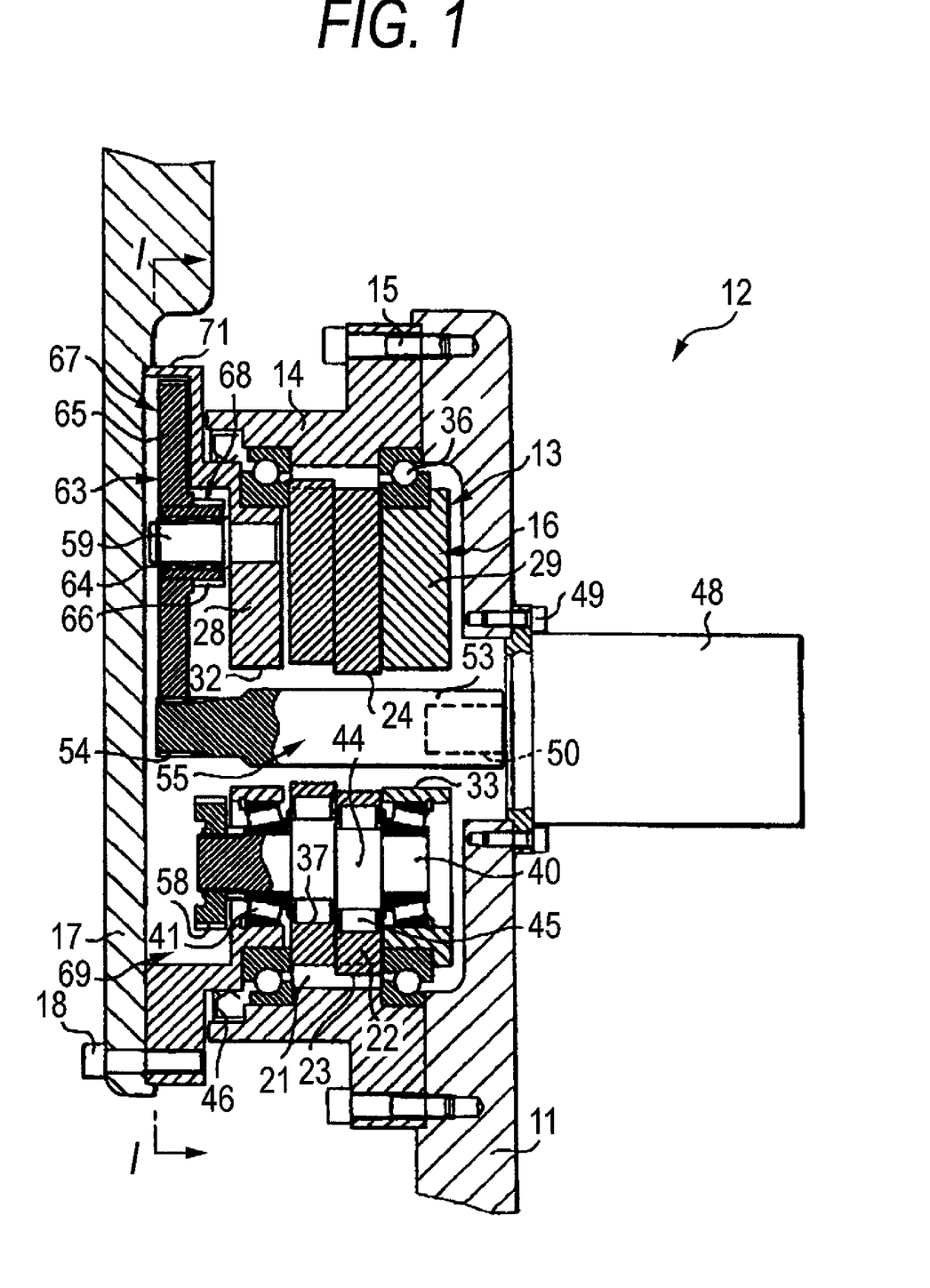
FIG. 1 is a front sectional view showing Embodiment 1 of the invention.
Figure 2:
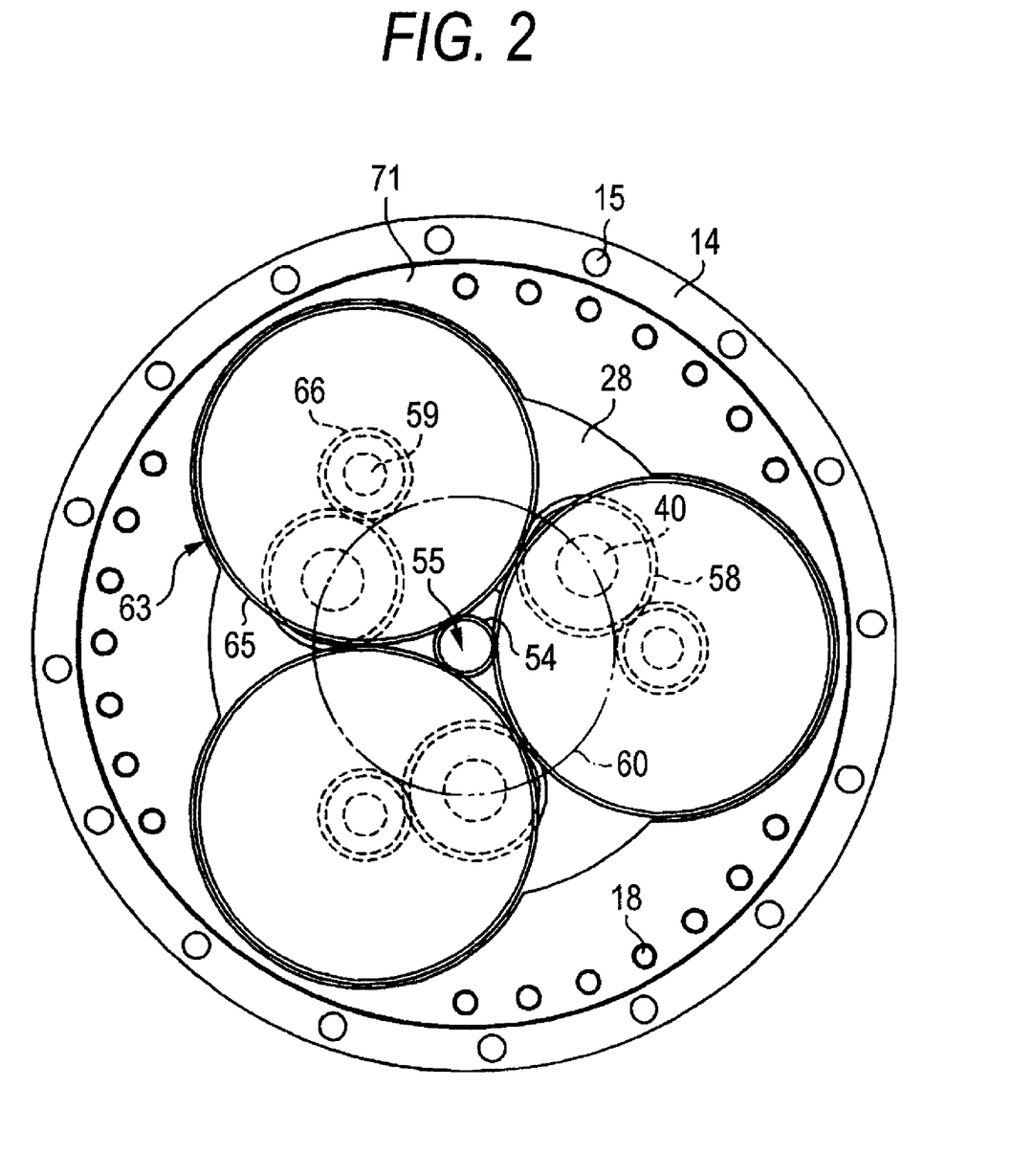
FIG. 2 is a view as seen from the direction of an arrow I-I of FIG. 1.
Figure 3:
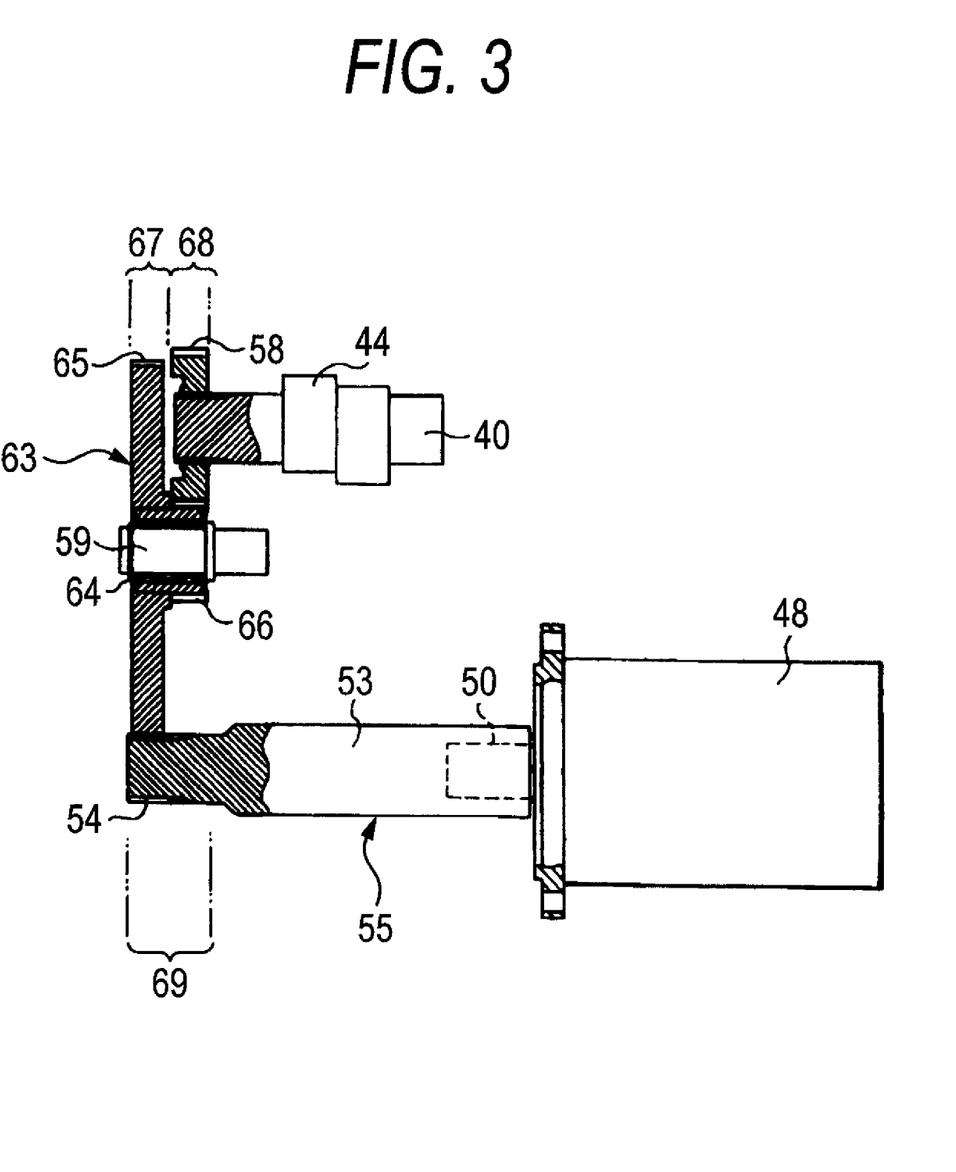
FIG. 3 is an explanatory view showing the transmission path of a driving force.

Referring to FIGS. 1, 2 and 3, reference numeral 11 denotes a base end arm serving as a first member of an industrial robot 12, and the base end arm 11 is turned about a base end. A fixed part, here, a case 14 of an eccentrically oscillating speed reducer 13 is fixed to one side face of a front end of the base end arm 11 by means of a plurality of bolts 15. Further, a base end of a front end arm 17 serving as a second member of the industrial robot 12 is fixed to a rotating part of the eccentrically oscillating speed reducer 13, here, one end of a carrier 16 by means of a plurality of bolts 18.

As a result, the front end arm 17 can be rotated (turned) about the base end with respect to the base end arm 11. If the case 14 is fixed and the carrier 16 is rotated as mentioned above, the speed reduction device becomes the same as that of a type that is conventionally used frequently, and can consequently be used with the same feeling as usual. Here, the case 14 assumes a substantially cylindrical shape, and pin teeth 21 serving as a number of internal teeth that are spaced apart at equal distances are provided at an inner periphery of an axial central portion of the case.

Within the case 14, a plurality of (two) pinions 22 are arranged and received axially, and external teeth 23 including a number of trochoidal teeth are formed at outer peripheries of the pinions 22. Here, the number of the external teeth 23 of the pinions 22 is slightly fewer than, here, is one fewer than the number of the pin teeth 21. Further, the external teeth 23 and the pin teeth 21 mesh with each other in a state where the pinions 22 and the case 14 are inscribed to each other. However, maximum meshing portions (deepest meshing portions) of the two pinions 22 have a phase shift of 180°.

Also, center holes 24 are formed in the central axes of the pinions 22 so as to pass therethrough. Further, a plurality of (three) through holes (not shown) that pass axially through the pinions are formed in an intermediate portion between inner and outer peripheries of each pinion so as to be spaced apart at equal distances in a circumferential direction. Further, although the carrier 16 is inserted into the case 14, the carrier 16 is composed of a pair of end plate parts 28 and 29 that are arranged on axial opposite outsides of the pinions 22, and a plurality of pillar parts (not shown) each of which has one end integrally formed with the end plate part 28 and the other end fastened to the end plate part 29. These pillar parts are loosely fitted into the through holes. Further, center holes 32 and 33 having a diameter that is approximately equal to that of the center holes 24 are formed in the carrier 16, specifically, on the central axes of the end plate parts 28 and 29.

Reference numeral 36 denotes a pair of bearings that are interposed between the carrier 16, specifically, the outer peripheries of the end plate parts 28 and 29, and the inner peripheries of both axial ends of the case 14, and the carrier 16 is supported by the bearings 36 so as to be relatively rotatable with respect to the case 14. Reference numeral 37 denotes a plurality of (three) crank holes that are formed in each pinion 22 and extend axially. These crank holes 37 are spaced apart at equal distances in the circumferential direction, and are arranged alternately with the through holes.

Reference numeral 40 denotes a plurality of (the same number as the crank holes 37) crankshafts. These crankshafts 40 are arranged so as to be spaced apart at equal distances in the circumferential direction. A pair of bearings 41 that are spaced apart axially are interposed between these crankshafts 40, and the carrier 16, specifically, the end plate parts 28 and 29. Thereby, axial opposite ends of the crankshafts 40 are rotatably supported by the carrier 16 via the pair of bearings 41.

Further, the crankshafts 40 have at their axial central portions eccentric portions 44 that are made eccentric by the same distance from the central axes of the crankshafts 40 and have the same number (two) as the pinions 22. These eccentric portions 44 are arranged axially adjacent to each other, have a phase shift of about 180°. Also, the eccentric portions 44 of the crankshafts 40 are inserted into the crank holes 37 of the pinions 22 via roller bearings 45, respectively. As a result, the relative rotation of the pinions 22 and the crankshafts 40 are allowed. In addition, reference numeral 46 denotes an oil seal that is interposed between the inner periphery of the case 14 on axial one side, and the carrier 16, specifically, the outer periphery of the end plate part 28 from the bearing 36 that is arranged on axial one side.

The aforementioned case 14, carrier 16, pinions 22, and crankshafts 40 constitute, as a whole, the eccentrically oscillating speed reducer 13 that reduces the speed of the rotation input to the crankshafts 40, to thereby output the reduced speed to the case 14 or carrier 16, here, the carrier 16. Reference numeral 48 denotes a motor attached to the other side face of the front end of the base end arm 11 by means of a plurality of bolts 49. A rotary shaft 50 of the motor 48 is coaxial with the central axis of the eccentrically oscillating speed reducer 13. If the motor 48 is made coaxial with the eccentrically oscillating speed reducer 13, the whole structure of a turning part can be made small, as compared with the case where a motor is installed so as to be separated by a predetermined distance in the radial direction from the central axis of the eccentrically oscillating speed reducer.

A transmission shaft 53 that passes axially through the center holes 24, 32, and 33 formed in the central portion of the eccentrically oscillating speed reducer 13 is fixed to the rotary shaft 50. A front end of the transmission shaft 53 is provided with one first external gear 54. The aforementioned rotary shaft 50 and transmission shaft 53 constitute, as a whole, an output shaft 55 of the motor 48 that extends towards axial one side through the center holes 24, 32, and 33. The first external gear 54 provided in the output shaft 55 rotates around its axis if the driving force from the motor 48 is transmitted thereto.

Reference numeral 58 denotes second external gears attached to axial one ends (axial one ends) of at least one, here, all crankshafts 40 by spline coupling. Reference numeral 59 denotes at least one, here, three (which is the same as the number of the second external gears 58) supporting shafts that extends parallel to the output shaft 55. These supporting shafts 59 are spaced apart at equal distances in the circumferential direction. The other portions of the supporting shafts are supported by the carried 16, specifically, by the carrier 16 by being inserted into and fixed to the end plate part 28.

Further, the supporting shafts 59 are arranged in the crankshafts 40 to which the second external gears 58 are attached, here in positions spaced apart in the circumferential direction from all the crankshafts 40 as mentioned above, and specifically, are arranged adjacent to peripheral one side of each of the corresponding crankshafts 40. Also, the supporting shafts are arranged on radial outside of an imaginary circle 60 passing through the central axes of all the crankshafts 40. The reference numeral 63 denotes third external gears of the supporting shafts 59 that are coaxial with the supporting shafts 59 and are rotatably supported via bearings 64 at axial one side portion of each of the supporting shafts 59. These third external gears 63 have at their axial one side large-diameter gears 65 that are larger in diameter than the first external gear 54.

These large-diameter gears 65 are arranged around the first external gear 54, and mesh with the first external gear 54.

Here, the large-diameter gears 65 are formed with such greatest diameter that they do not interfere with each other. As a result, it is possible to obtain a speed reduction ratio by meshing between the first external gear 54 and the large-diameter gears 65. Further, the third external gears 63 have at their axial other side small-diameter gears 66, respectively. The small-diameter gears 66 are arranged close to the corresponding large-diameter gears 65 in the coaxial relationship therewith. Also, these small-diameter gears 66 have a smaller diameter than the second external gears 58, and mesh with the corresponding second external gears 58.

The aforementioned first external gear 54, and large-diameter gears 65 of the third external gears 63 constitute, as a whole, a first-stage gear speed reducing mechanism 67, and the small-diameter gears 66 of the third external gears 63, and the second external gears 58 constitute, as a whole, a second-stage gear speed reducing mechanism 68. These first-stage and second-stage gear speed mechanisms 67 and 68 constitutes, as a whole, a pre-stage speed reducing mechanism 69 that is arranged at a front stage of the eccentrically oscillating speed reducer 13. Here, as mentioned above, since the supporting shafts 59 are on the radial outside of the imaginary circle 60 passing through the central axes of all the crankshafts 40, the diameter of the large-diameter gears 65 of the third external gears 63 can be made larger, and thereby, the speed reduction ratio of a speed reduction device can be increased easily. In addition, the above-mentioned supporting shafts 59 are arranged on peripheral intermediate positions of the adjacent corresponding crankshafts 40, or in the vicinity of the adjacent corresponding crankshaft. Thereby, the small-diameter gears 66 may be made to mesh with second external gears 58 adjacent to both sides thereof, or a second external gear 58 adjacent to one side thereof. By doing so, the diameter of the second external gears 58 will become large. As a result, the speed reduction ratio of the second-stage gear speed reducing mechanism 68 can be further increased.

Moreover, if the large-diameter gears 65 are formed with such greatest diameter that they do not interfere with each other as mentioned above, an outward flange 71 projecting radially outward from the outer periphery of the central portion of the case 14 is formed in the portion of the end plate part 28 on its axial one side in order to surround the large-diameter gears 65 from the outside. If the outward flange 71 is formed like this, one side, i.e., axial one side of the oil seal 46 is substantially closed by the outward flange 71 to thereby effectively suppress penetration of dust into the eccentrically oscillating speed reducer 13. Further, since the aforementioned bolts 18 are jointly fastened to the outward flange 71 and the front end arm 17, the radial distance from the central axis of the eccentrically oscillating speed reducer 13 to the bolts 18 becomes long, so that the transmission torque from the eccentrically oscillating speed reducer 13 to the front end arm 17 can be increased.

Next, the operation of Embodiment 1 will be described.

When the front end arm 17 is rotated (turned) with respect to the base end arm 11 in the industrial robots 12 as described above, the motor 48 is operated to rotate the output shaft 55. The rotation of the output shaft 55 is transmitted to all the crankshafts 40 while the speed thereof is gradually reduced by the first external gear 54 and the large-diameter gears 65 of the third external gear 63, and subsequently by the small-diameter gears 66 of the third external gears 63, and the second external gears 58, thereby rotating these crankshafts 40 at the same rotational speed in the same direction around its own central axis.

At this time, although the eccentric portions 44 of the crankshafts 40 are eccentrically rotated within the crank holes 37 of the pinions 22 to rotate the pinions 22 in an eccentric oscillation manner, since the number of the external teeth 23 of each pinion 22 is one fewer than the number of the pin teeth 21 of the case 14, the carrier 16 is significantly reduced in speed by the eccentric oscillating rotation of the pinions 22, and rotates at low speed, thereby rotating (turning) the front end arm 17 about a base end.

Here, two-stage gears, that is, the large-diameter gears 65 and small-diameter gears 66 of the third external gears 63 are supported by the supporting shafts 59 that is supported by the carrier 16 as mentioned above, while one-stage second external gears 58 that mesh with the small-diameter gears 66 are only attached to the axial one ends (one ends) of the crankshafts 40, the axial length of the whole speed reduction device becomes short, and consequently, miniaturization becomes possible.

Further, since gears mesh with each other only in two places, that is, between the first external gear 54 and the large-diameter gears 65 of the third external gears 63, and between the small-diameter gears 66 of the third external gears 63 and the second external gears 58 until a driving force is transmitted to the crankshafts 40 from the first external gear 54, noises can be reduced, and energy loss can also be reduced. Moreover, since only one type of the third external gears 63 have the large-diameter gears 65 and small-diameter gears 66, the structure can be made simple.

Embodiment 2

Figure 4:
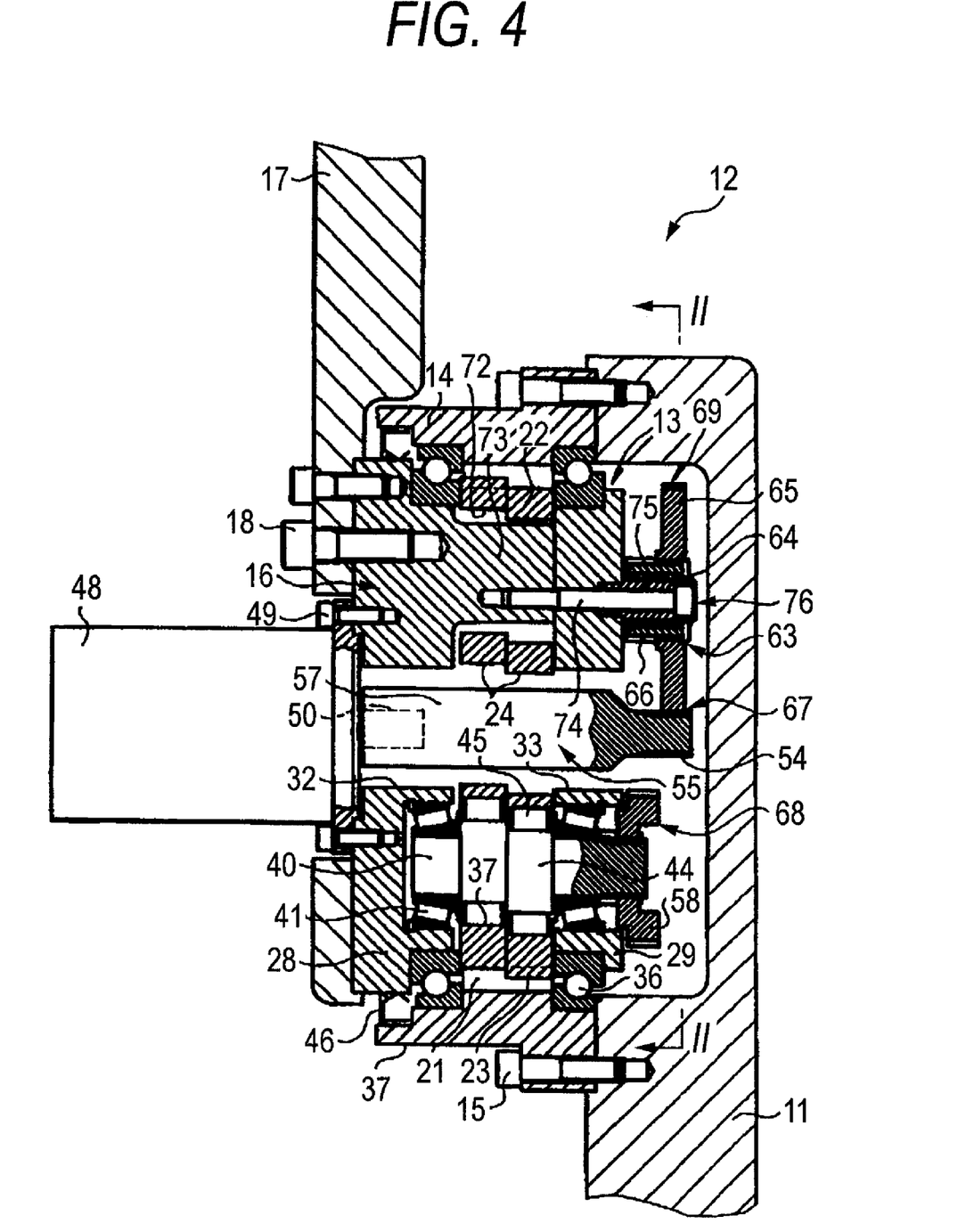
FIG. 4 is a front sectional view showing Embodiment 2 of the invention.
Figure 5:
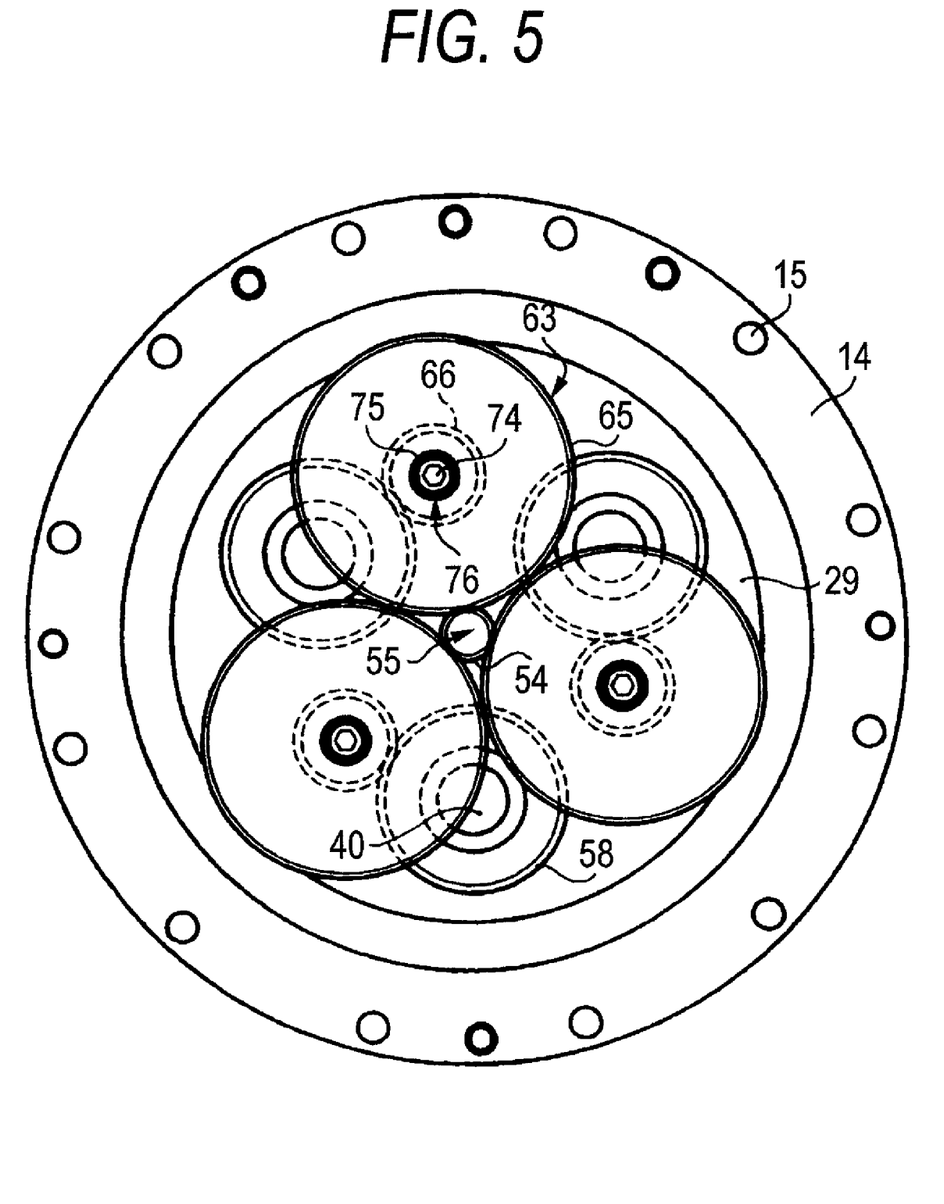
FIG. 5 is a view as seen from the direction of an arrow II-II of FIG. 4.
Figure 6:
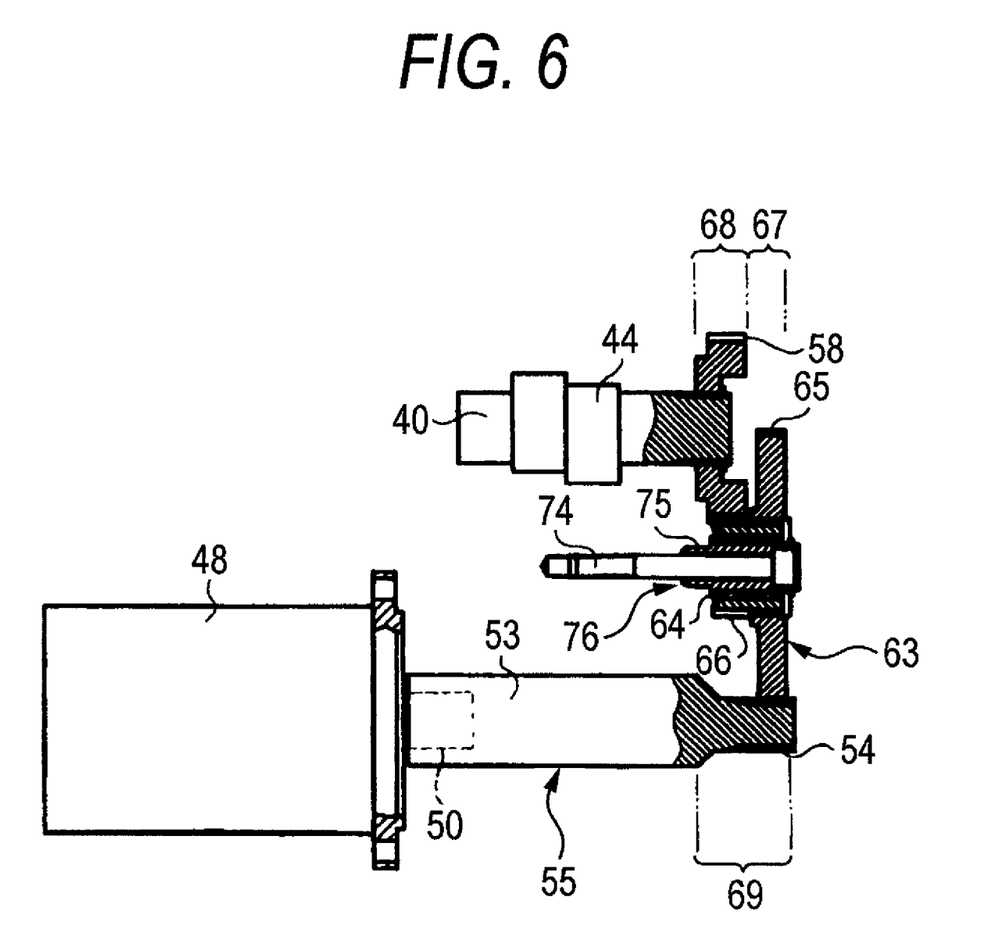
FIG. 6 is an explanatory view showing the transmission path of a driving force.

Hereinafter, Embodiment 2 of the invention will be described with reference to the drawings. FIGS. 4, 5, and 6 are views showing Embodiment 2 of the invention. In the present embodiment, the motor 48 is attached to the end plate part 28 of the carrier 16 by means of the plurality of bolts 49, and the first external gear 54 is provided at the front end (other end) of the output shaft 55 extending toward the axial other side from the motor 48. Further, the second external gears 58 are attached to the axial one ends (axial other ends) of the crankshafts 40 of the eccentrically oscillating speed reducer 13.

Moreover, in the present embodiment, similarly to the previous embodiment, the carrier 16 is composed of at least two or more, here, three members including the end plate parts 28 and 29, and pillar parts 73 fitted into through holes 72 that are formed in the pinions 22 formed integrally with the end plate part 28. Among these, the pillar parts 73 and the end plate part 29 are jointly fastened by means of a plurality of (the same number as the number of the pillar parts 73) bolts 74 as fastening members that are screwed towards axial one side. In addition, the above-mentioned pillar parts 73 and end plate part 29 are usually fastened even by bolts or pins other than the bolts 74 as fastening members as mentioned above.

Also, these bolts 74 constitute supporting shafts 76. Outside these supporting shafts 76 (bolts 74), the third external gears 63 having the large-diameter gears 65 located on the axial other side and the small-diameter gears 66 located on the axial one side are rotatably supported via cylindrical intermediate members 75 and bearings 64. The large-diameter gears 65, similarly to the previous description, meshes with one first external gear 54, and the small-diameter gears 66 mesh with the second external gears 58. In addition, the aforementioned intermediate members 75 and bearings 64 can also be omitted. In this case, it is preferable to integrally form a bearing metal, etc. at an outer periphery of the bolts 74 supporting the third external gears 63.

When the carrier 16 is composed of two or more members (end plate parts 28 and 29 and pillar parts 73) as mentioned above, if the pillar parts 73 and the end plate part 29 are fastened together by means of the supporting shafts 76 (bolts 74) that rotatably support the third external gears 63, the supporting shafts 76 can be used commonly for fastening of the carrier 16, and for supporting of the third external gears 63, and thereby, the structure becomes simple, and the production cost can also be made low. In addition, other configurations and operations are the same as those of Embodiment 1.

In addition, in the above-mentioned embodiments, the second external gears 58 are attached to all the (three) crankshafts 40, the third external gears 63 are made to supported by the supporting shafts 59 of the same number (three) as the crankshafts 40, and the large-diameter gears 65 of the three third external gears 63 are made to mesh with the one first external gear 54, while the small-diameter gears 66 of the three third external gears 63 are made to mesh with the corresponding second external gears 58. However, in the invention, a second external gear may be attached to only any one of the crankshafts, a single third external gear may be made to be supported only by one supporting shaft installed between the crankshaft, and a crankshaft adjacent to the crankshaft, and a large-diameter gear of the third external gear may be made to mesh with the first external gear one to one, while the small-diameter gear of the third external gear may be made to mesh with the second external gear. In this case, the motor may be arranged radially away from the central axis of the eccentrically oscillating speed reducer by a predetermined distance.

Further, in the above-mentioned embodiment, the portions of the supporting shafts 59 on their axial one side are fixed to the carrier 16 (end plate part 28), while the third external gears 63 are made to be rotatably supported by the portions of the supporting shafts 59 on their axial one side, via the bearings 64. However, in the invention, the supporting shafts may be rotatably supported by the carrier via the bearings, while the third external gears may be fixed to the supporting shafts. In any case, the third external gears become rotatable. In the above-mentioned embodiments, the supporting shafts 59 are made to be supported by the carrier 16 (end plate part 28). However, in the invention, the supporting shafts may be made to be supported by a second member (front end arm) of an industrial robot connected integrally with the carrier. Further, in the above-mentioned embodiments, the supporting shafts 59 are made to be supported by the carrier 16 (end plate part 28 or 29) so as to protrude towards an arm (front end arm 17 or base end arm 11). However, in the invention, the supporting shafts may be made to be supported by the carrier (end plate part) so as to protrude towards the pinions.

Further, in the above-mentioned embodiments, a difference in number of teeth between the number of the pin teeth 21 of the eccentrically oscillating speed reducer 13 and the external teeth 23 of the pinions 22 is one. In the invention, the difference may be two. Moreover, in the above-mentioned embodiments, the case 14 that is a fixed part of the eccentrically oscillating speed reducer 13 is attached to the base end arm 11 that is a first member of the industrial robot 12, and the carrier 16 that is a rotating part is attached to the front end arm 17 that is a second member of the industrial robot 12. However, in the invention, the carrier that is a fixed part of the eccentrically oscillating speed reducer may be attached to the first member of the industrial robot, and the case that is a rotating part may be attached to the second member.

INDUSTRIAL APPLICABILITY

The invention can be applied to the structure of a turning part of an industrial robot using the eccentrically oscillating speed reducer.

The invention claimed is:

1. A speed reduction device comprising:
an eccentrically oscillating speed reducer having:
a cylindrical case (14) in which internal teeth (21) are formed;
a pinion (22) in which external teeth meshing with the internal teeth are formed;
a plurality of crankshafts (40) which are inserted into the pinion at an eccentric portion (44) thereof and to which a second external gear (58) is attached; and
a carrier (16) rotatably supported by the case and supporting rotatably the crankshafts; and
a first external gear (54) rotated by transmission of a driving force from a motor (48);
a large-diameter gear transmitting the rotation of the first external gear; and
a small-diameter gear (66) transmitting the rotation of the large-diameter gear to the second external gear; and
a supporting shaft (59,76) which is supported by the carrier and in which the large-diameter gear and the small-diameter gear are provided,
wherein the large-diameter gear is larger than the small-diameter gear and the large-diameter gear and the small-diameter gear are coaxial.

2. The speed reduction device according to claim 1, wherein the supporting shaft is disposed at a position apart from the crankshafts in a circumferential direction.

3. The speed reduction device according to claim 1, wherein the large-diameter gear has a larger diameter than the first external gear, and the small-diameter gear has a smaller diameter than the second external gear.

4. The speed reduction device according to claim 1, wherein the supporting shaft is arranged on the radial outside of an imaginary circle passing through the central axes of all of the crankshafts.

5. The speed reduction device according to claim 1, wherein when the carrier is composed of two or more members, the supporting shaft is a fastening member that fastens the two or members together.

6. The speed reduction device according to claim 1, wherein the second external gear is attached to an axial one end of at least one of the crankshafts.

7. A turning part comprising:
a speed reduction device according to claim 1;
a base end arm (11) of an industrial robot fixed to the case of the speed reduction device; and
a front end arm (17) of the industrial robot fixed to the carrier of the speed reduction device.

8. A turning part comprising:
a speed reduction device according to claim 2;
a base end arm (11) of an industrial robot fixed to the case of the speed reduction device; and
a front end arm (17) of the industrial robot fixed to the carrier of the speed reduction device.

9. A turning part comprising:
a speed reduction device according to claim 3;
a base end arm (11) of an industrial robot fixed to the case of the speed reduction device; and
a front end arm (17) of the industrial robot fixed to the carrier of the speed reduction device.

* * * * *